United States Patent [19]

Mason et al.

[11] Patent Number: 4,988,376

[45] Date of Patent: Jan. 29, 1991

[54] GLASSIFICATION OF LEAD AND SILICA SOLID WASTE

[75] Inventors: Glenn M. Mason; Gerald Gardner, both of Laramie, Wyo.

[73] Assignee: Western Research Institute, Laramie, Wyo.

[21] Appl. No.: 388,372

[22] Filed: Aug. 2, 1989

[51] Int. Cl.[5] .............................. C03B 5/02; C03C 3/07
[52] U.S. Cl. ........................................... 65/134; 65/27;
501/27; 501/60; 423/DIG. 20
[58] Field of Search .................. 65/19, 27, 32, 134,
65/136; 106/313, 434; 501/27, 60; 423/DIG. 20

[56] References Cited

U.S. PATENT DOCUMENTS

| | | | |
|---|---|---|---|
| 1,169,506 | 1/1916 | Osgood. | |
| 1,488,914 | 4/1924 | Gelstharp | 65/134 X |
| 1,962,270 | 6/1934 | Dunn. | |
| 2,217,808 | 10/1940 | Nye. | |
| 2,220,750 | 11/1940 | Bair | 65/134 X |
| 2,773,775 | 12/1956 | Levengood | 65/134 X |
| 3,001,881 | 9/1961 | Slayter | 65/2 X |
| 3,469,740 | 9/1969 | Crowe | 65/134 X |
| 3,524,738 | 8/1970 | Grubb | 65/134 |
| 3,589,885 | 6/1971 | Monks | 65/134 |
| 3,630,267 | 12/1971 | Hlinka et al. | 65/134 X |
| 3,830,639 | 8/1974 | Evans et al. | 65/19 |
| 3,994,708 | 11/1976 | Reth | 65/32 |
| 4,313,747 | 2/1982 | Barton | 65/134 X |
| 4,341,566 | 7/1982 | Barrett | 106/313 |
| 4,581,163 | 4/1986 | Meininger et al. | 252/633 |
| 4,612,292 | 9/1986 | Richard | 501/27 |
| 4,632,690 | 12/1986 | Colwell, Jr. et al. | 65/134 |
| 4,666,490 | 5/1987 | Drake | 65/19 X |
| 4,678,493 | 7/1987 | Roberts et al. | 65/134 |
| 4,759,879 | 7/1988 | Cadoff et al. | 252/629 |
| 4,820,325 | 4/1989 | Wheeler | 65/27 |

FOREIGN PATENT DOCUMENTS 62-232600 10/1987 Japan.

*Primary Examiner*—Robert L. Lindsay
*Attorney, Agent, or Firm*—Browdy and Neimark

[57] ABSTRACT

Lead or other heavy metals are rendered immobile for sanitary disposal by vitrifying the silica-based soil or other medium in which the lead or heavy metal is contained. The silica sand or other soil contaminated with lead is heated to the melting point of the silica. A melt accelerator or fluxing agent is added to lower the melting point of the silica. A reducing agent is added to cause a separation of the metallic phases from the glass. The glass formed retains a portion of the lead, with excess metals, e.g., gold, silver, and platinum, separating. These metals may be recovered at any time after this point in the process.

In the case of a silica-poor medium, such as a soil that does not contain sufficient quartz to perform the process successfully, additional quartz sand or scrap glass is added to the process in quantity sufficient to ensure the formation of the glass slag.

The slag formed by the process of the present invention is extremely impervious to leaching by groundwater, therefore removing the contaiminate from the environment.

13 Claims, 4 Drawing Sheets

```
REFERENCE       K-RATIO        NET COUNTS
 ( 1) PBM       0.27566          79400
 ( 4) NAK       0.19273           4689
 ( 7) FEK       0.01526           5603
 (10) ABL       0.00426           1426
 (13) BBL       0.13973          52692
 (16) CUL       0.87700           6175
 (19) SIK       0.09615          54840
 (22) ALK       0.01349           5662

BQ: QUANTIFY

REF.S  EDS: PBM    EDS: NAK    EDS: FEK    EDS: AGL    EDS: SBL    EDS: CUL
  EDS: BIK    EDS: ALK

ZAF CORRECTION      10.00 KV      35.00 DEGS.
NO. OF ITERATIONS 2
----     K     [Z]    [A]    [F]    [ZAF]   ATOM.%   WT.%
PB-M  0.338  1.223  1.045  0.999  1.277   13.14   37.07
NA-K  0.034  0.805  2.103  0.998  1.690   15.95    5.00  *
FE-K  0.159  0.868  1.020  1.000  0.886   15.92   12.11
AG-L  0.005  1.026  1.086  0.990  1.105    0.36    0.53
BB-L  0.294  1.072  1.063  0.999  1.139   17.37   28.81
CU-L  0.027  0.924  1.888  0.998  1.742    4.75    4.11  *
SI-K  0.126  0.787  1.299  0.990  1.014   28.81   11.02
AL-K  0.013  0.810  1.455  0.992  1.170    3.69    1.36  *
  * - HIGH ABSORBANCE
```

GLASSIFICATION OF LEAD AND SILICA SOLID WASTE

FIELD OF THE INVENTION

The present invention relates to a method for reducing, stabilizing, and/or immobilizing lead or other elements in the environment by recovery and/or sanitary disposal.

BACKGROUND OF THE INVENTION

Lead is an essential commodity in the industrialized world, ranking fifth in tonnage of metals consumed, after iron, copper, aluminum, and zinc. The principal uses of lead and its compounds are storage batteries, tetraethyllead for increasing octane rating of gasolines, pigments, ammunition, solders, plumbing, cable coverings, bearing, and caulking. Because of its softness and high density, lead is an ingredient in many alloys.

However, lead and its compounds are cumulative poisons, and should not come into contact with food and other substances that may be ingested. Lead enters the body through inhalation and ingestion, is absorbed into the circulatory system from the lungs and digestive tract, and excreted via the urine and feces. Normally, intake of lead approximately equals output. However, excessive exposure and intake of lead can upset the balance and cause tissue concentrations to increase to the point where illness can result. Symptoms of lead poisoning include anemia, fatigue, headache, weight loss, and constipation. More sever manifestations include damage to the nervous system and to the kidneys.

The particle size and chemical composition of lead and lead compounds affect the readiness with which lead is absorbed from the lungs and digestive tract. Larger particles and compounds with lower solubility are less hazardous than finely divided particles and compounds of higher solubility.

Because lead may be ingested and inhaled, and because particle size and chemical composition affect its absorption, it is important that the concentration of lead in the environment be limited as much as possible.

Because lead has been found to be particularly dangerous in the environment, the use of lead as an additive in automobile fuels has been sharply curtailed. However, there is still a great deal of lead present as waste in the environment. For example, there is a great deal of sand containing lead oxide paint chips recovered from sandblasting operations, and there are many soils contaminated with lead from battery disposal or manufacturing operations.

A number of methods have been developed to deal with disposal of hazardous metal wastes. However, most of these methods are costly and do not produce useable end products.

Osgood, in U.S. Pat. No. 1,169,506, discloses a process for treating slag which may contain lead by heating small particles of the slag in the presence of a more easily fusible silicate and further treating the particles either with other fusible salts or with a coloring material. The slag consists largely of silica with a greater or lesser percentage of calcium oxide or other relatively refractory oxides.

Dunn, in U.S. Pat. No. 1,962,270, discloses a method for treating slags, including lead slags, by mixing one equivalent of silica with one equivalent of base, and heating the mixture in a reducing atmosphere. Metallic impurities can be removed by skimming the surface of the molten slag. Sulfur is removed as sulfides, which are produced in the reducing atmosphere of the heating process. Sand or other minerals can be added to the slag, which effects some chemical combination with the molten silicates in addition to the mechanical admixture. The treated slag can be used as a binding agent or cement for small sized materials to form a type of concrete.

Roberts et al., in U.S. Pat. No. 4,678,493, disclose a method for vitrifying asbestos waste by combining the asbestos with waste glass and a melt accelerator to dissolve the asbestos and to produce a homogeneous glass.

Nye, in U.S. Pat. No. 2,217,808, discloses a method for converting furnace slag into a glasslike composition by taking molten slag as it emerges from a blast furnace and adding silica thereto to form an improved glasslike material.

Colwell, Jr. et al., in U.S. Pat. No. 4,632,690, disclose a method for removing hazardous waste comprising impinging a flame on a surface of molten mass material, injecting into the molten mass solid or sludge type hazardous or toxic waste material, heating the molten mass by the flame, and transferring the molten mass from the melting chamber to the refining chamber upon destruction of certain hazardous or toxic waste material embodied therein. The product is a glasslike material. This system provides for destruction of toxic wastes by pyrolysis and/or combustion, which would not destroy the toxicity of lead-containing waste.

Wheeler, in U.S. Pat. No. 4,820,325, discloses a method for treating a filter cake impregnated with a toxic material comprising heating the filter cake, which is formed of a glass precursor material, with at least one other glass precursor material, at sufficiently high temperatures to form a molten composition which solidifies upon cooling to form a glass. The glass can be disposed of without danger of the toxic material leaching out.

Meininger et al., in U.S. Pat. No. 4,581,163, disclose a method for conditioning weakly to medium-active wastes through fused vitrification by means of electrodes which generate the melting heat. The waste, with optional additive materials such as silicates in the form of clay dust, quartz sand, and diatomaceous earth, is fused to form a glassy product.

Cadoff et al., in U.S. Pat. No. 4,759,879, disclose an alkoxide glass formed composition including silica-containing constituents, which can be used for the immobilization of nuclear waste.

Japanese Patent No. 62-232600 discloses a method for disposing of material containing zirconium or a zirconium alloy by adding a eutectic and compressing the material to form a coiled material. The coiled material is put into a crucible and heated to 1000°-1200° C. to melt the material and dispose of the zirconium.

SUMMARY OF THE INVENTION

It is an object of the present invention to overcome the above-mentioned deficiencies in the prior art.

It is another object of the present invention to provide a method to reduce the quantity of lead or other heavy metals in the environment by recovery and/or sanitary disposal.

It is another object of the present invention to provide a method for rendering lead or other harmful metals immobile for sanitary disposal.

It is a further object of the present invention to treat soils contaminated with heavy metals.

It is yet another object of the present invention to provide a method to recover precious metals from lead-containing waste materials.

It is still a further object of the present invention to provide a shielding material for radioactive waste materials.

According to the present invention, lead or other heavy metals are rendered immobile for sanitary disposal by vitrifying the soil or other medium in which the lead or heavy metal is contained. The material contaminated with lead is heated in an electric or gas furnace to at least 1000° C. A melt accelerator or fluxing agent is added to lower the melting point of the silica so that the temperature of the formation of the glass is significantly lower than the melting temperature of silica. A reducing agent is added to cause a separation of the metallic phases from the glass. The glass formed retains a portion of the metals originally present in the material, with excess metals, e.g., lead, gold, silver, and platinum, separating. These metals may be recovered at any time after this point in the process.

In the case of a silica-poor medium, such as a soil that does not contain sufficient quartz to perform the process successfully, additional quartz sand or scrap glass is added to the process in quantity sufficient to ensure the formation of the glass slag.

The slag formed by the process of the present invention is extremely impervious to leaching by groundwater, therefore removing the contaminate from the environment.

A particularly important use for the lead-glass slag produced by the present invention is for disposal of radioactive waste. The lead content in the glass slag makes it possible to use this slag as a shielding material, either formed into containers, or as a covering agents, for radioactive materials.

DETAILED DESCRIPTION OF THE INVENTION

Figure 1:
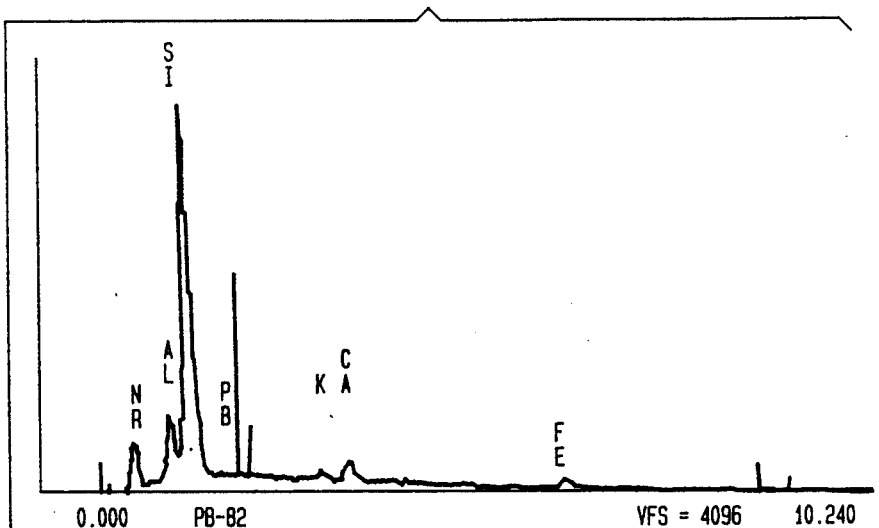
FIG. 1 shows an energy dispersive X-ray spectrum of the overall glass obtained by the process of the present invention.

According to the present invention, lead-containing waste, such as lead-contaminated soils from battery disposal or manufacturing operations, or lead-containing paint chips recovered from a sandblasting operation, are heated with a silica flux. This temperature is far above the melting point of elemental lead or any oxide or carbonate phase of the lead. A fluxing agent such as the sodium sesquicarbonate mineral trona, is added to the process stream to lower the melting point of the silica to about 1000°–1200° C.; the melting temperature of silica is approximately 1300°–1600° C. This fluxing agent is added in amounts sufficient to lower the melting point of the silica without lowering the temperature of the process below the melting point of the lead or the lead compounds therein.

The primary function of the flux is to aid in formation of a glass eutectic and to solubilize any metals that are not reduced.

A reducing agent such as wheat flour or other suitable reducing agent such as charcoal, sulfur, or carbon containing compounds, is added to cause the metallic phase to separate from the glass. This is particularly important where recoverable metals, such as precious metals often associated with lead in waste materials, are present. Lead can thus be recovered in its metallic state for recycling to appropriate uses for the lead, and the precious metals can be recovered for further use. The amount of reducing agent and silica is controlled so that the amount of lead in the slag formed can be controlled. For example, where it is desired to use the slag as a shielding material for radioactive waste, the amount of lead in the slag is high. Where the lead is to be recovered for recycling, the amount of lead in the slag is much lower.

A number of conventional alkaline fluxes can be used in the process according to the present invention. These compounds need not be used in the pure form, but can be used as complexes which are readily available for industrial use. Barium oxide has a lesser effect on the thermal expansion of the mixture during heating. The best source for barium oxide to be used as a flux is barium carbonate, and the barium carbonate can be introduced directly into the waste materials for heating to form a glass.

Calcium oxide can be obtained from calcium carbonate; calcium borate; dolomite; calcium fluoride, better known as fluorspar; bone ash, which is refined calcium phosphate; and wollastonite, calcium silicate, can all be used as fluxes in the process according to the present invention.

Lithium oxide can be used in the present invention from sources including lepidolite $(LiF.KF.Al_2O_3.3SiO_2)$; spudomene, $Li_2O.Al_2O_3$; lithium carbonate, $Li_2CO_3$; petalite, $Li_2O.Al_2O_3.8SiO_2$; amblygonite, $2LiF.Al_2O_3.P_2O_3$.

Potassium oxide has a similar fluxing action to the sodium salts. The potassium oxide can be introduced into the glassmaking melt in the form of potassium carbonate, more commonly known as pearl ash; potash feldspar, $K_2O.Al_2O_3.6SiO_2$; Cornwall stone, a complex compound of variable composition, roughly similar to a feldspar and including fluxes of calcium, sodium, and potassium; Carolina stone, a domestic product similar to Cornwall stone; and volcanic ash, with a ceramic formula of 0.660 $K_2O$, 0.899 $Al_2O_3$, 9.59 $SiO_2$, 0.230 $Na_2O$, 0.060 $Fe_2O_3$, 0.05 $TiO_2$, 0.096 CaO. 0.14 MgO; and plastic vitrox, including alumina and silica.

Sodium oxide can be added to the material in the form of sodium chloride, sodium carbonate, sodium bicarbonate, borax, soda feldspar $Na_2O.2B_2O_3.10H_2O$); cryolite, $Na_3AlF_6$; or nepheline syenite, $K_2O.0.3Na_2O.4Al_2O_3.9SiO_2$.

Sodium bicarbonate can be used, either alone or in combination with sodium carbonate as the flux in the process according to the present invention.

Borax is another material that can be used as a flux in the present invention, either alone or in combination with boric acid. Other boron compounds that can be used include colemanite, $2CaO.3B_2O_3.5H_2O$, which is a natural hydrated calcium borate which functions as an alkaline flux in the present invention.

Other materials that can be used as alkaline fluxes include iron oxides, which can be used in the form of ferrous oxide, ferric oxide, or ferrous-ferric oxide; and magnesium carbonate.

Trona is particularly well suited to be used as an alkaline flux in the process according to the present invention, because it is readily available, and the decomposition products thereof, carbon dioxide and water, are entirely nonhazardous. Trona also has the advantage of ready availability in a form that is acceptable for use in the present invention, and it is relatively inexpensive.

Where the lead-containing waste does not contain sufficient silica to form a slag according to the present invention, quartz or scrap glass or other readily available source of silica is added to the waste material to insure formation of a suitable glass slag.

The slag so formed is extremely impervious to leaching from groundwater, and thus removes the lead or other heavy metal contaminants from the environment in a form that can safely be disposed of.

A glass having a very high proportion of silica, such as up to about 75% silica, has been found to hold the heavy metals very tenaciously, and the slag so formed is extremely stable and strong.

The lead-containing waste materials can be treated according to the present invention in a process similar to a conventional glass making process. Glass is typically produced in a continuous tank wherein the molten glass is maintained at a constant level, and raw materials are fed at a rate equal to that at which the finished product is withdrawn. A typical glass furnace consisting of a charging chamber called a doghouse, where raw materials are fed to a melting chamber, a refining chamber which received heated molten glass from the melting chamber and holds it for a time to achieve a suitable working temperature for withdrawal of the glass as a molten mass, and a space above the molten glass called the combustion chamber which provides combustion space for the flame. Frequently, two regenerator checkers chambers and an exhaust stack each having secondary checkers chambers and a flue are included to complete the major components of a glass furnace.

The basic raw materials for making glass are composed of three predominate oxides: silicon dioxide (sand), sodium oxide or soda ash, and calcium oxide or lime. The composition of glass is often expressed in terms of these oxides. For example, a typical glass product may comprise approximately 75 percent sand, 17.5 percent soda ash, and 7.5 percent lime. The melting of glass is conducted at temperatures ranging from about 2370-2925 degrees F. The heat must be sufficiently intense to bring about the reaction between the ingredients of the raw materials and to dissolve the silica.

In the process according to the present invention, the use of the flux enables a solid glass to be formed at much lower temperatures, with a concomitant lowering of the energy requirements for disposing of the toxic metal waste. The reducing agent in the flux provides a means to remove metals contained in the waste material for subsequent reuse.

A typical glass-making facility is described more fully in U.S. Pat. No. 4,632,690, the entire contents of which are hereby incorporated by reference. However, it should be understood that the process of the present invention does not use the same process parameters as those disclosed in the '690 patent.

In the process of the present invention, the ratio of acid (silica) to base (carbonate or other anion) in the flux is dependent upon the contents of the material being fused and the particular final use for the glass so formed. The higher the silica content of the glass, the greater the amount of lead that can be contained in the glass. For example, where the glass is to be used for radioactive shielding, a lead content of greater than 30% would be required. Higher melt temperatures, of course, require less fluxing material. However, higher melt temperatures require greater energy input and more expensive components to be incorporated into the processing equipment. The more silica present in the reacting system, the higher fusion temperature required to achieve the desired glassification. Therefore, the higher the temperature, the more efficient the fusion.

The flux is added in a quantity to reduce the fusion temperature from the melt temperature of silica, which is approximately 1300°-1600° C., to between 1000° and 1200° C. The melt temperature of the mixture of the present invention must be at least 1000° C.

Figure 2:
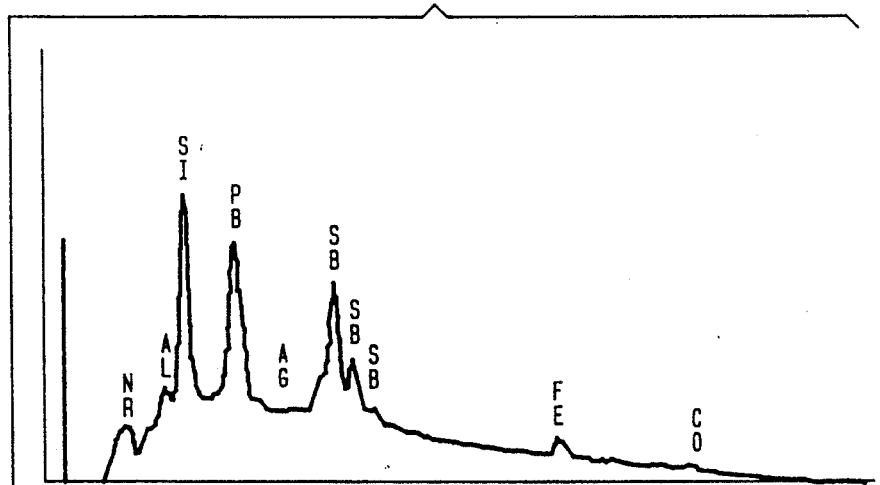
FIG. 2 is a dispersive X-ray spectrum showing metals separated according to the process of the present invention.
Figure 3:
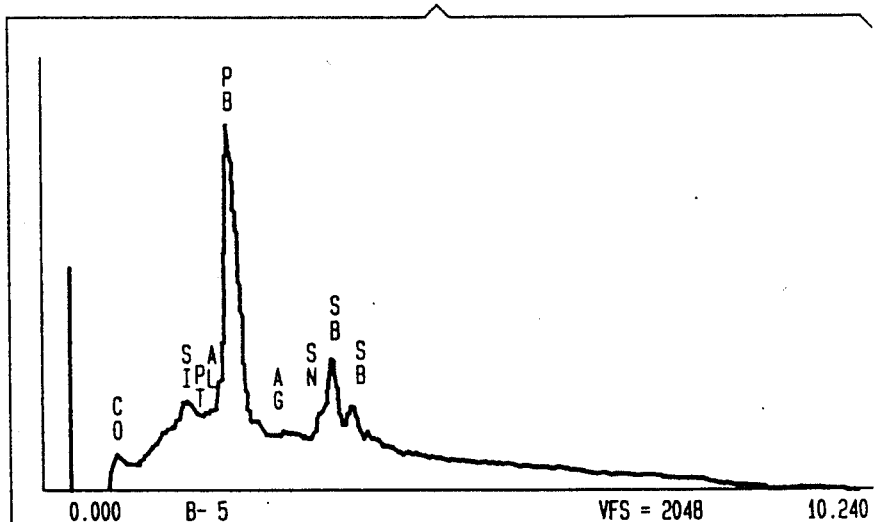
FIG. 3 shows an energy dispersive X-ray spectrum of separated metals with a high silver content obtained according to the process of the present invention.
Figure 4:
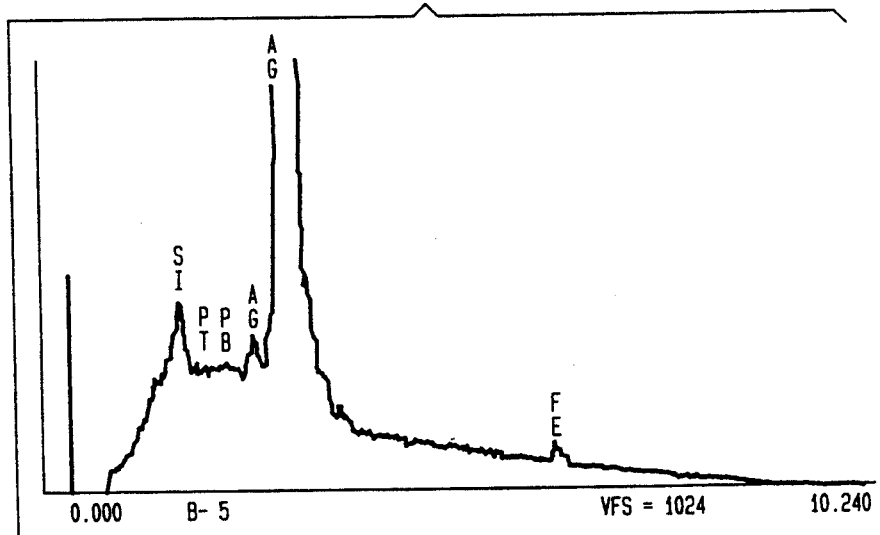
FIG. 4 is a dispersive X-ray spectrum of concentrating metals separated by the process according to the present invention showing the presence of platinum.

In order to determine the metal content of the material to be treated, a sample of the material is weighed and added to a crucible. The appropriate flux is added, i.e., soda, borax, silica, and reducing agents, and the material is mixed with the flux and reducing agent in the crucible. The crucible is placed into a furnace which has been pre-heated to 1000°-1200° C. After fusion is complete, the glass is poured into a mold. After the glass is cooled, the glass (slag) can readily be separated from the metal, as the product is a solid with the glass on top and the metal on the bottom. The metals separated from the glass can then be analyzed for content and quantity. FIGS. 1-4 show analyses of the products obtained by the process of the present invention.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed is:

1. A process for treating solid wastes lead contaminated soils and waste containing lead containing paint chips in solid waste immobile consisting essentially of heating said solid wastes with a fluxing agent to a temperature sufficient to melt silica present in said solid waste and the lead contained therein, to form a slag and recovering the slag so formed.

2. The process according to claim 1 wherein a reducing agent is further included with the fluxing agent.

3. The process according to claim 1 wherein the fluxing agent is selected from the group consisting of trona, barium oxide, barium carbonate, calcium oxide, calcium carbonate, calcium borate, dolomite, calcium fluoride, calcium phosphate, wollastonite, calcium silicate, lithium oxide, lepidolite, spudomene, lithium carbonate, petalite, amblygonite, potassium oxide, potassium carbonate, feldspar, Cornwall stone, Caroline stone, sodium oxide, sodium chloride, sodium carbonate, sodium bicarbonate, borax, soda feldspar, nepheline syenite, and colemanite.

4. The process according to claim 3 wherein the fluxing agent is trona.

5. The process according to claim 2 wherein the reducing agent is selected from the group consisting of wheat flour, charcoal, sulfur containing compounds, and carbon containing compounds.

6. The process according to claim 5 wherein the reducing agent is wheat flour.

7. The process according to claim 5 wherein the reducing agent is charcoal.

8. A process according to claim 1 wherein silica is added to said solid waste to ensure formation of a slag.

9. A process for recovering precious metals from solid wastes comprising subjecting said solid wastes to the process according to claim 2 and recovering said precious metals from the bottom of the slag so formed.

10. The process according to claim 9 wherein said precious metals are selected from the group consists of gold, silver, and platinum.

11. The process according to claim 1 wherein additional quartz or scrap glass is added to the waste material.

12. The process according to claim 1 wherein the silica is present in an amount of at least about 5% by weight.

13. The process according to claim 1 wherein the flux is added in amount sufficient to melt the mixture of metal and silica at a temperature of from about 1000° to about 1200° C.

* * * * *